June 18, 1963  G. M. SNYDER  3,093,942
PRESSURE WORK HOLDING DEVICE FOR GRINDING MACHINES
Filed March 15, 1962
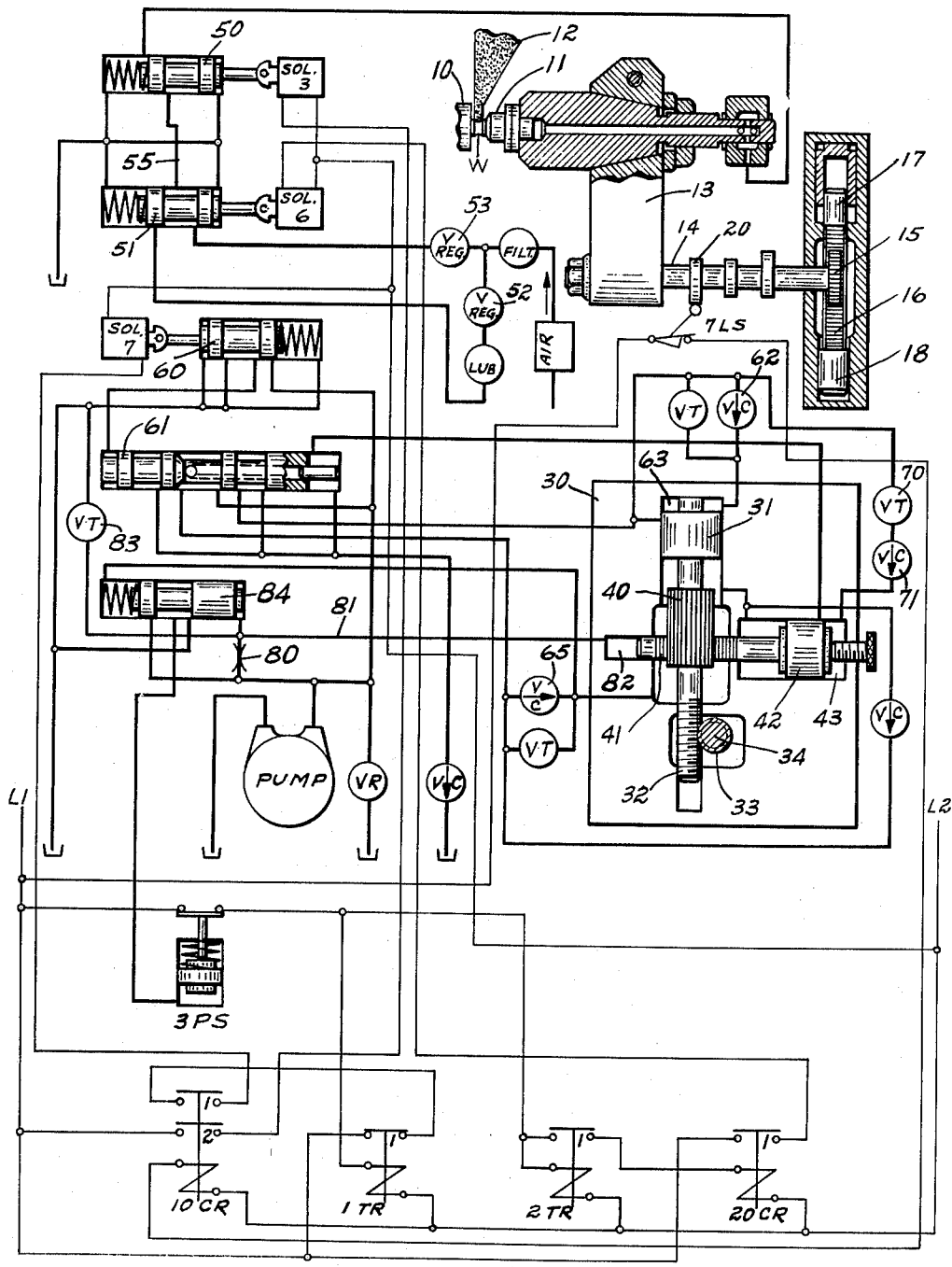
INVENTOR
GLENN M. SNYDER
BY
Hugh N. Roche
ATTORNEY 3,093,942
PRESSURE WORK HOLDING DEVICE FOR
GRINDING MACHINES
Glenn M. Snyder, Waynesboro, Pa., assignor to Landis
Tool Company, Waynesboro, Pa.
Filed Mar. 15, 1962, Ser. No. 179,902
11 Claims. (Cl. 51—165)

This invention relates to machines for grinding an external diameter on annular workpieces such as race rings for anti-friction bearings.

In the grinding of very small bearings, or bearings of non-magnetic material, a clamping device is necessary to hold the bearings against a face plate. For grinding very small bearings, even those of magnetic material, which may be held by a magnetic face plate, the forces exerted by a grinding wheel is such that additional clamping means is necessary.

During the rough grinding operation, high clamping pressures are required to support the workpiece against the various forces resulting from the grinding operation. If the same clamping forces continue on the workpieces through finish grinding until final size is reached, the workpieces are frequently distorted to the extent that they will not pass inspection.

It is, therefore, an object of the present invention to provide means for eliminating distortion due to clamping pressures in annular workpieces.

Another object is to provide means for supplying a high clamping pressure during rough grinding which is changed automatically to a lower pressure during finish grinding.

The drawing is a hydraulic and electric diagram of a machine for grinding the outside diameters of annular workpieces.

Workpiece W is supported against face plate 10 by means of pressure operated clamp 11 for a grinding operation by grinding wheel 12. Clamp 11 is supported in loading arm 13 pivotally mounted for rotation on one end of shaft 14. Structural details of clamp 11 are similar to those shown in co-pending application Serial No. 73,389, filed December 2, 1960, and others in which a clamping element is free to move radially with the workpiece. The other end of shaft 14 has a pinion 15 engaging rack 16 having a small piston 17 on one end and a larger piston 18 on the other end. Cam 20 is mounted on shaft 14 in position to engage limit switch 7LS.

The rack and pinion device for rotating shaft 14 is disclosed in greater detail in co-pending application, Serial No. 110,714, filed May 17, 1961.

Grinding wheel 12 is rotatably supported on wheel support 30 for movement toward and from operative relation with workpiece W. The means for moving grinding wheel 12 toward and from the work consists of a rapid feed piston 31 connected to feed screw 32. Feed screw 32 is in operative engagement with gear 33 on shaft 34 which may be rotated by means of a hand wheel (not shown).

A sliding pinion 40 on feed screw 32 engages rack 41 which is movable in a direction at right angles to the axis of said feed screw 32 by means of piston 42 and cylinder 43. A similar feed mechanism is described in detail in U.S. Patent 2,313,479, granted March 9, 1943.

The means for supplying fluid at different pressures for the operation of clamp 11 consists of a valve 50 actuated by solenoid 3 and valve 51 actuated by solenoid 6. These are pushtype solenoids. Solenoid 3 is connected to valve 50 and solenoid 6 is connected to valve 51. These valves co-operate to provide first, a high clamping pressure, and thereafter, a low clamping pressure for workpiece W.

*Operation*

When arm 13 is swung into position by rack 16, pinion 15 and shaft 14 to place workpiece W on face plate 10, cam 20 closes limit switch 7LS to complete a circuit to energize control relay 10CR. Control relay contact 10CR1 completes a circuit from normally closed timer relay contact 1TR1 to energize valve solenoid 7.

Valve 60 moves to the right to direct fluid under pressure to the left hand end of feed reversing valve 61, shifting valve 61 to the right to direct fluid under pressure through check valve 62 to the head end of rapid feed cylinder 63 to move piston 31 and feed screw 32 and the wheel support 30 to advance grinding wheel 12 into grinding position. At the same time, fluid is directed through throttle valve 70 and check valve 71 to the head end of cylinder 43 to move piston 42 and rack 41 to the left to rotate pinion 40 and feed screw 32 to provide a grinding feed.

Fluid under pressure from the pump passes through restriction 80 and line 81 to recess 82 in which the end of rack 41 moves during a grinding operation. When rack 41 is advanced to a point which it restricts the flow of from line 81, the feed movement stops and pressure builds up in the line between restriction 80 and throttle valve 83 to shift valve 84 to the left. In this position of valve 84, fluid under pressure from the pump is directed to actuate pressure switch 3PS to close a circuit to energize sparkout timer relay 1TR and clamp pressure timer relay 2TR.

Control relay contact 10CR2 completes a circuit to energize valve solenoid 3 to shift valve 50 to the left to direct fluid under pressure to clamp 11.

Fluid under pressure, in this case, air, is supplied to valve 50 through line 55 from valve 51. In its normal or right hand position, valve 51 connects line 55 with a source of fluid under high pressure from regulator 52.

A predetermined interval after the beginning of the sparkout operation, during which the force exerted by grinding wheel 12 on the work is reduced due to the stopping of the feed movement, timer relay 2TR times out, closing timer relay contact 2TR1 which completes a circuit from line L1 and pressure switch 3PS to energize control relay 20CR. Control relay contact 20CR1 completes a circuit from line L1 to energize solenoid 6 which shifts valve 51 to the left. In this position, valve 51 blocks the supply of high pressure fluid from regulator 52 and connects line 55 with low pressure fluid from regulator 53. Workpiece W is thus held by a much lighter pressure and is, therefore, free of distortion during the finish grinding operation.

After a predetermined interval, the grinding operation is completed, and relay 1TR times out, opening relay contact 1TR1 and deenergizing solenoid 7. Valve 60 is shifted to the left, connecting the left hand end of valve 61 with exhaust so that constant pressure on the other end of valve 61 shifts said valve to the left. In this position, fluid under pressure is directed through check valve 65 to the rod ends of cylinders 43 and 63 to return feed pistons 31 and 42 and grinding wheel 12 to retracted position.

Pressure is reduced on pressure switch 3PS which opens to deenergize and reset timer relays 1TR and 2TR.

Loading arm 13 is shifted to unload position, opening limit switch 7LS and deenergizing control relay 10CR, opening relay contacts 10CR1 and 10CR2 to deenergize solenoid 3 to reset valve 50 for the next operation.

Timer relay contact 1TR1 closes preparatory to the next grinding cycle.

Timer relay contact 2TR1 opens to deenergize control relay 20CR, opening relay contact 20CR1 and deenergizing solenoid 6 so that valve 51 is returned to right hand position and ready to supply high pressure clamping fluid to clamp 11.

I claim:

1. In a grinding machine having a grinding wheel and a rotatable face plate, means comprising a clamping member for holding ring-like workpieces against said face plate, means for supplying fluid under pressure to hold said clamping member against said workpieces including high and low pressure fluid conduits, and means for alternately connecting said clamping member to said high and low pressure fluid conduits.

2. In a grinding machine having a grinding wheel and a rotatable face plate, a feed mechanism for advancing and retracting said grinding wheel relative to said face plate for a grinding operation, means for holding ring-like workpieces against said face plate comprising a clamping member, means for supplying fluid under pressure to hold said clamping member against said workpieces including high and low pressure fluid conduits, a selector valve for alternately connecting said clamping member to said high and low pressure fluid conduits, and means operable in response to the advance of said feed mechanism for actuating said selector valve.

3. In a grinding machine having a grinding wheel and a rotatable face plate, a feed mechanism for advancing and retracting said grinding wheel relative to said face plate for a grinding operation, means for holding workpieces against said face plate comprising a clamping member for holding workpieces against said face plate, means for supplying fluid under pressure for actuating said clamping member including high and low pressure fluid conduits, means for alternately connecting said high and low pressure fluid conduits to said clamping member, and means responsive to said feed mechanism for actuating said connecting means.

4. In a grinding machine having a grinding wheel and a rotatable face plate, a feed mechanism for advancing and retracting said grinding wheel relative to said face plate for a grinding operation, means for holding workpieces against said face plate comprising a clamping member, means for supplying fluid under pressure for actuating said clamping member including high and low pressure fluid conduits, and a selector valve normally in position to connect one of said fluid conduits with said clamping member.

5. In a grinding machine having a grinding wheel and a rotatable face plate, a feed mechanism for advancing and retracting said grinding wheel relative to said face plate for a grinding operation, means for stopping said feed mechanism after a predetermined advancing movement, means for holding workpieces against said face plate comprising a clamping member, means for supplying fluid under pressure to hold said clamping member against said workpieces including high and low pressure fluid conduits, a selector valve for alternately connecting said clamping member to said high and low pressure fluid conduits, and means operable a predetermined interval after stopping said feed mechanism for actuating said selector valve.

6. In a grinding machine having a grinding wheel and a face plate, means for advancing and retracting said grinding wheel relative to said face plate including a feed mechanism, means for carrying workpieces into operative relation with said face plate comprising a loading arm, a clamping member on said loading arm, means for supplying fluid under pressure to hold said clamping member against a workpiece including a selector valve for directing fluid under different pressures to said clamping member, said selector valve being normally positioned to supply a relatively high pressure to said clamping member, stopping means for limiting the advance of said feed mechanism, control means actuated by said stopping means and operable a predetermined interval after said stopping means for shifting said selector valve to change the pressure on said clamping member, means operable when a workpiece has been ground to size for retracting said grinding wheel, said loading arm being operable after retraction of said grinding wheel to transfer the workpiece to unloading position, and control means operable by said loading arm for stopping the flow of fluid under pressure to said clamping member.

7. In a grinding machine, a grinding wheel, a face plate, means for advancing and retracting said grinding wheel relative to said face plate including a feed mechanism, means for carrying workpieces into operative relation with said face plate comprising a loading arm, a pressure operated clamping member on said loading arm, means for supplying fluid under pressure to hold said clamping member against a workpiece, means actuated by said loading arm for effecting the advance of said grinding wheel and for controlling the supply of fluid under pressure to said clamping member, means for supplying fluid to said clamping member at different pressures including a selector valve normally positioned to supply a relatively high pressure to said clamping member, means for stopping the advance of said feed mechanism, control means actuated by said stopping means and operable a predetermined interval after said stopping means for shifting said selector valve to change the pressure on said clamping member, and means operable when a workpiece has been ground to size for retracting said grinding wheel.

8. In a grinding machine, a grinding wheel, a face plate, means for advancing and retracting said grinding wheel relative to said face plate, including a feed mechanism, means for carrying workpieces into operative relation with said face plate comprising a loading arm, a clamping member on said loading arm, means for supplying fluid under pressure to hold said clamping member against a workpiece including a selector valve for directing fluid under different pressures to said clamping member, said selector valve being normally positioned to supply a relatively high pressure to said clamping member, stopping means for limiting the advance of said feed mechanism, control means actuated by said stopping means and operable a predetermined interval after said stopping means for shifting said selector valve to change the pressure on said clamping member, control means also actuated by said stopping means and operable after a predetermined interval longer than said first interval for retracting said grinding wheel.

9. In a grinding machine having a grinding wheel and a face plate, means for holding workpieces against said face plate comprising a clamping member, means for supplying fluid under pressure to hold said clamping member against said workpiece including a selector valve, separate lines for supplying fluid under pressure to said selector valve, means for regulating the pressure in each line, one of which is set to supply fluid at a high pressure on the clamping member and the workpiece for a rough grinding operation, the other of which is set to supply fluid at a lower pressure to hold said workpiece during a finish grinding operation.

10. In a grinding machine having a grinding wheel and a face plate, means for holding workpieces against said face plate comprising a clamping member, means for supplying fluid under pressure to hold said clamping member against said workpiece including a selector valve, separate lines for supplying fluid under pressure to said selector valve, means for regulating the pressure in each line, one of which is set to supply a high pressure on the work for a rough grinding operation, the other of which is set to supply fluid under pressure at a lower pressure to hold said workpiece during a finish grinding operation, and means to shift said selector valve to connect said clamping member to said lower pressure.

11. In a grinding machine, a grinding wheel, a face plate, means for advancing and retracting said grinding wheel relative to said face plate including a feed mechanism, means for carrying workpieces into operative relation with said face plate comprising a loading arm, a clamping member on said loading arm, means for supplying fluid under pressure to hold said clamping member against a workpiece including a selector valve for directing fluid under different pressures to said clamping member, said selector valve being normally positioned to supply a relatively high pressure to said clamping member, stopping means for limiting the advance of said feed mechanism, control means actuated by said stopping means and operable a predetermined interval after said stopping means for shifting said selector valve to change the pressure on said clamping member, control means also actuated by said stopping means and operable after a predetermined interval longer than said first interval for retracting said grinding wheel, said loading arm being operable after retraction of said grinding wheel to transfer the workpiece to unloading position, and control means operable by said loading arm for stopping the flow of fluid under pressure to said clamping member.

References Cited in the file of this patent
UNITED STATES PATENTS

| | | |
|---|---|---|
| 2,927,406 | Terp | Mar. 8, 1960 |
| 2,961,808 | Dunigan | Nov. 29, 1960 |